Sept. 11, 1962 F. DI DONATO 3,053,303
TIRE CHAIN ATTACHING DEVICE
Filed March 9, 1961 3 Sheets—Sheet 1

Inventor:
Florenzo DiDonato,
by Munro V. Hamilton
Attorney

Sept. 11, 1962     F. DI DONATO     3,053,303
TIRE CHAIN ATTACHING DEVICE
Filed March 9, 1961     3 Sheets-Sheet 2
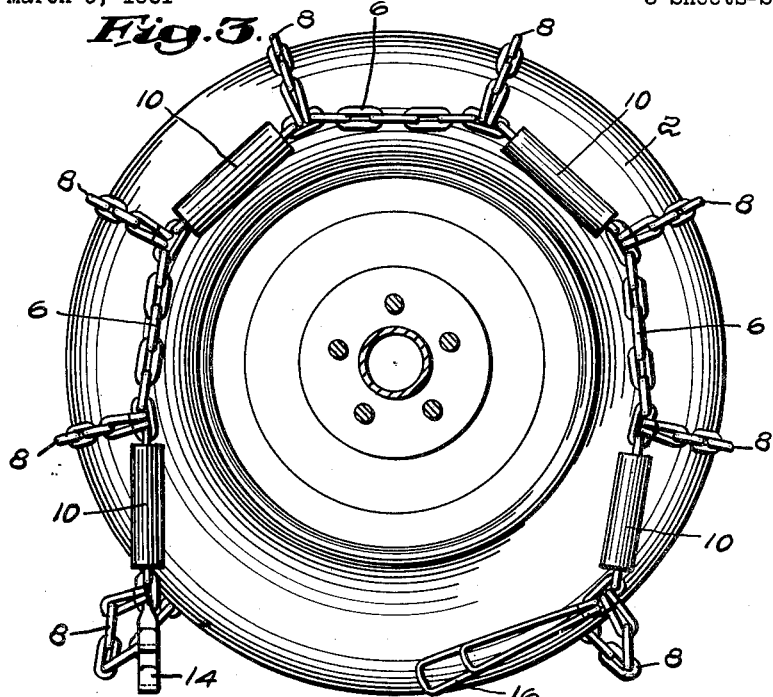
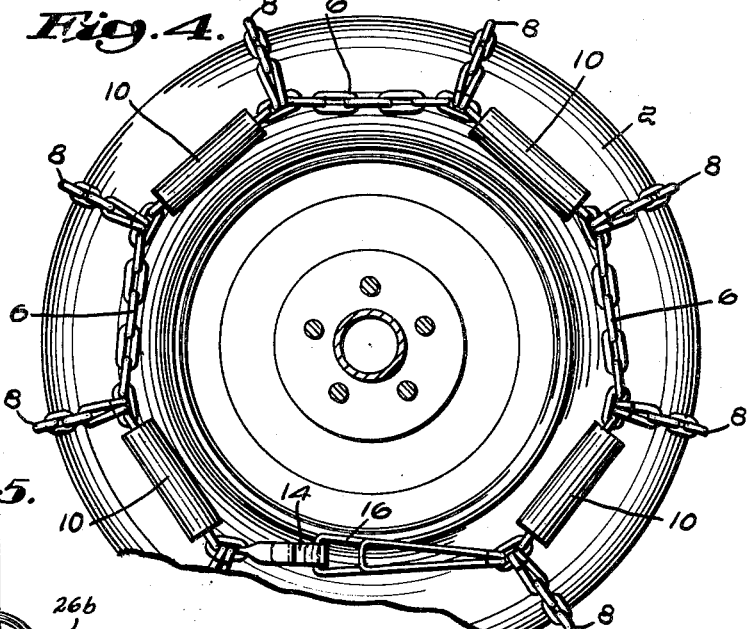
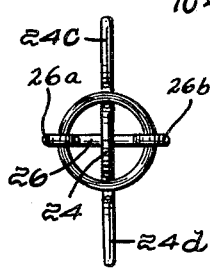
Inventor:
Florenzo DiDonato,
by
Attorney Sept. 11, 1962 F. DI DONATO 3,053,303
TIRE CHAIN ATTACHING DEVICE
Filed March 9, 1961 3 Sheets-Sheet 3
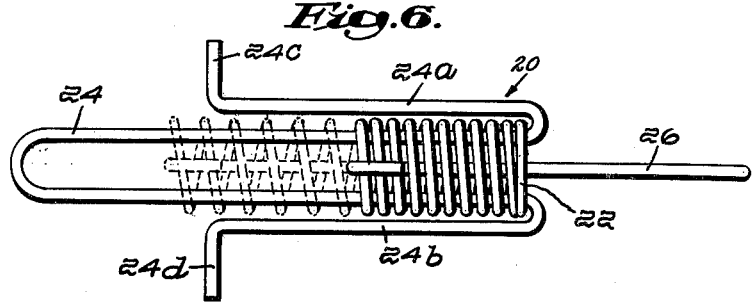
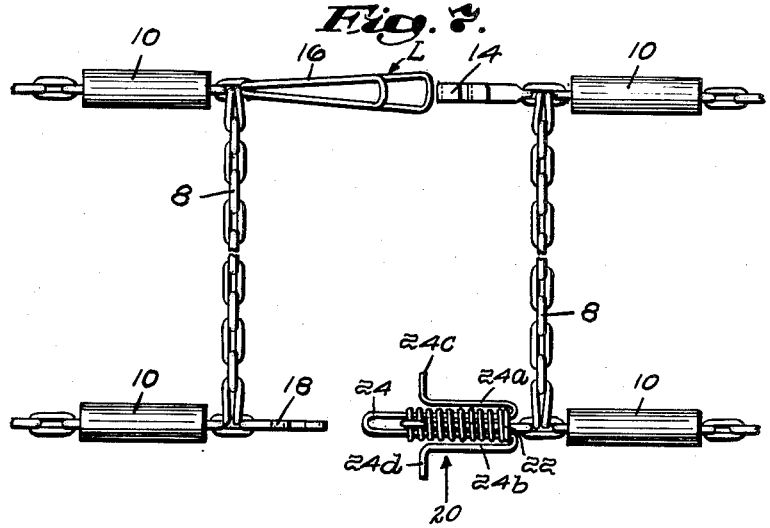
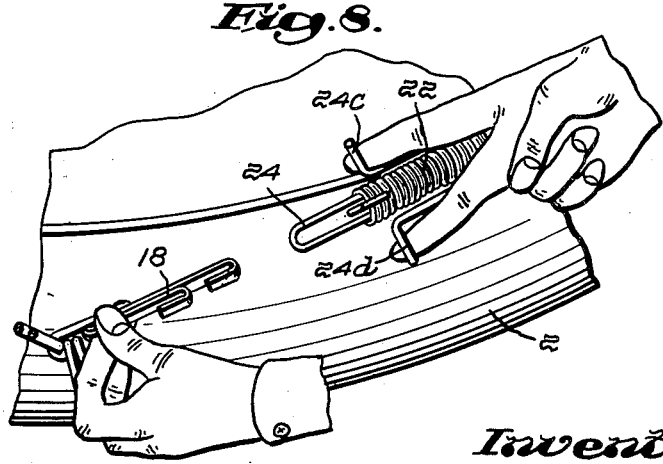
Inventor:
Florenzo DiDonato,
by
Attorney

United States Patent Office 3,053,303
Patented Sept. 11, 1962

3,053,303
TIRE CHAIN ATTACHING DEVICE
Florenzo Di Donato, 197 Forest St.,
Arlington Heights, Mass.
Filed Mar. 9, 1961, Ser. No. 94,471
2 Claims. (Cl. 152—241)

This invention relates to tire chains and more particularly to an improved link attaching device for securing together the inner and outer ends of a tire chain when engaged over an automobile tire.

The operation of installing tire chains presents a number of difficulties and many devices have been proposed to facilitate the job of correctly placing a chain on a tire and then attaching the opposite ends at both the inside and outside of the tire. There continues to be experienced a great deal of difficulty in locating conventional chain members properly on the tire and then securing it. This is particularly so when the installation has to be made with the automobile tire standing in snow.

The collapsible nature of the linkages makes it difficult to hold portions of the chain body in a position to be attached to other portions and this is further complicated by the extreme inaccessibility of the chain ends which are to be connected at the inside of the tire. In many cases still further difficulty develops in securing the ends at the outer side of the tire because the chain body is not properly distributed throughout the tire circumference and the conventional connecting linkage cannot be pulled together sufficiently to provide for snapping the parts into interlocking relationship.

It is a chief object of the invention to deal with the problems indicated and to devise an improved tire chain construction which includes a novel attaching device for securing the ends of the chain in connected relationship.

Another object of the invention is to provide an arrangement of parts by means of which the operation of placing and attaching tire chain portions may be greatly facilitated and the entire operation of chain installation greatly simplified.

Still another object is to provide a chain attaching means of unique construction utilizing a very limited number of parts.

The nature of the invention and its further objects and novel features will be more fully understood and appreciated from the following description of preferred embodiments of the invention selected for purposes of illustration and shown in the accompanying drawings, in which:

FIG. 3 is another side elevational view showing the inside of a tire with the tire chain construction of the invention installed thereon and further indicating attaching means of the invention for connecting the ends of the chain at the inside of the tire;

FIG. 4 is a view generally similar to FIG. 3 and further showing the ends brought together and connected with the attaching device of the invention;

FIG. 5 is an end elevational view of the spring attaching device employed at the outside of the tire;

FIG. 6 is an enlarged detail view of the spring attaching device shown in FIGS. 1 and 2;

FIG. 7 is a detail plan view of the two ends of the tire chain removed from the tire; and FIG. 8 is a diagrammatic view illustrating one position of adjustment of the tire chain illustrating the finger-operated attaching device supported in a position for engagement with a hook member.

With the above-noted objectives in mind, I have devised a tire chain construction including attaching means and special sleeve members. The attaching means comprises two separate attaching devices, one of which consists of an inside bridging loop and hook assembly for facilitating the operation of bringing together and securing chain length ends at the inside of a tire, and the other consists of an outside hook and finger-operated spring loop for securing chain ends at the outside of the tire member.

Figure 1:
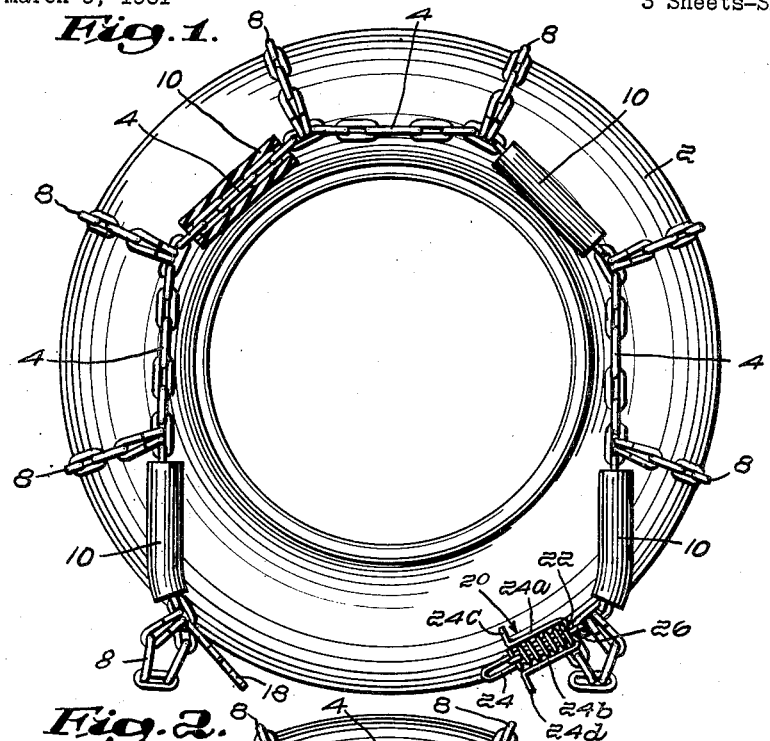
FIG. 1 is a side elevational view of a tire with the tire chain construction of the invention mounted around the tire with the tire chain ends ready to be pulled together and connected.
Figure 2:
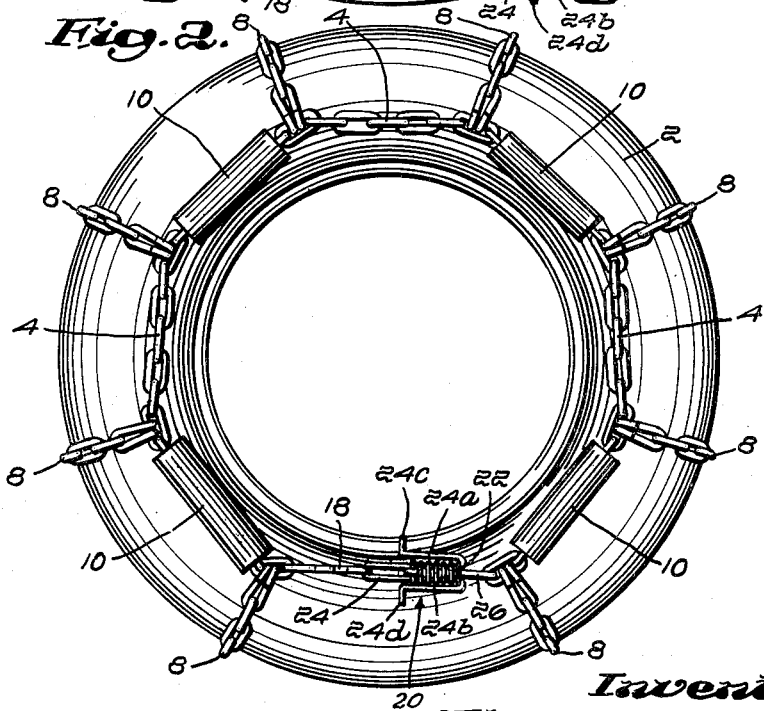
FIG. 2 is a view similar to FIG. 1 and further showing the tire chain ends connected at the outside of the tire.

Considering these various components in detail, numeral 2 indicates an automobile tire of conventional nature on which is located the tire chain assembly of the invention. The latter member is made up of an outside linkage or chain 4 extending circumferentially around the outer tire wall, as shown in FIGS. 1 and 2, and an inside linkage or chain 6 extending around the inside tire wall, as shown in FIGS. 3 and 4. These inside and outside linkages are connected together at circumferentially spaced intervals by cross linkages 8 or chain sections forming tread members.

In a preferred form of the invention I combine these inside and outside linkages with special linkage supporting sleeves. These linkage supporting sleeves are denoted by the numeral 10 and consist of tubular rubber or plastic bodies of an appreciable thickness chosen to provide a considerable degree of stiffness when engaged over a series of connected links as shown in the drawings. The length of each tubular sleeve 10 is further chosen such that it substantially fills the space between the cross linkages 8 so that the several links which are contained in any one of the sleeves tend to become held in a fixed position against an adjacent surface of a tire side wall. This provides a desirable degree of stability, particularly useful in placing the tire chain on a tire and maintaining the links in a correctlly distributed relationship around the tire circumference just prior to the operation of engaging the ends of the chain. In addition, the tubular members are of material assistance in supporting and bringing together the attaching devices of the invention hereinafter disclosed.

Attention is directed to FIGS. 3 and 4, which illustrate the attaching device which I have devised for securing the ends of the inside linkage of the tire chain. As will be apparent from an inspection of FIG. 3, the attaching device includes a hook member 14, and a bridging loop 16. The bridging loop 16 consists of a rigid elongated wire member whose length is chosen to extend across and bridge the space between cross links 8, as is better shown in FIG. 7. By thus providing a loop member which is of a length roughly corresponding to the space between the cross linkages it becomes possible for an operator, while standing or kneeling in front of an automobile tire on a vehicle to readily reach in back of the tire and hold the hook member 14 in one hand, while grasping the bridging loop 16 in the other hand. This operation is further aided by the presence of the sleeves 10 which tends to maintain the two ends of this inside linkage in an extended position of adjustment while engagement of loop 16 over the hook 14 is being accomplished. It is pointed out that by using the elongated loop 16, the space is easily bridged without the operator having to reach around in back of the tire to the same extent as is ordinarily required in the installation of all conventional attaching devices. Thus this difficult job of attaching the inside ends is greatly simplified and can be very quickly carried out.

The attacshing device for the outside chain linkage consists of a hook member 18 and a spring loop mechanism 20 which is shown in further detail in FIGS. 6 and 7. As will be observed from an inspection of FIG. 7 the spring loop mechanism 20, and the hook 18, have a combined length which is appreciably less than the combined length of the bridging loop 16 of the hook 14. As a result, it is necessary with the tire chain installed on a tire for the spring loop mechanism 20 to be extended for an appreciable distance so that it may be engaged with the hook 18 and accomplish a desired engagement.

In order to provide for resiliently containing the spring loop mechanism 20, I have devised a novel spring unit which is made up of three separate parts combined in a way such that they are resiliently supported with respect to one another. One component consists of a coiled spring 22 which may consist of a steel wire. In this coiled spring is received a loop element 24 which projects from an end of the spring and at the other end of the spring is reversely folded at two opposite points to provide externally located portions as 24a and 24b. These portions terminate in right angularly extending ends 24c and 24d arranged to constitute finger grip members. Also received through the coiled spring is another loop member 26 which has one end extending from the coiled spring and connected through a link of the outside chain linkage 4. The other end of loop member 26 is formed with two reversely bent hook ends as 26a and 26b engaged over the outermost turn of the coiled spring member 22.

It will be observed that in this arrangement of parts the loop 26 in effect anchors the coiled spring to the chain linkage 4, while permitting the spring to be compressed when the loop 24 is drawn outwardly by exerting a force through the finger grip portions 24c and 24d. When loop 24 is engaged over hook 18, a resilient holding force is continuously exerted.

It will also be seen that this arrangement of parts is also exceedingly convenient to hold and attach as has been suggested diagrammatically in FIG. 8. As shown therein the finger grip portions 24c and 24d are engaged by the index finger and middle finger, for example, and the loop portion 24 is drawn out against the resistance of the coiled spring 22. At the same time the operator can support the hook member 18 with the other hand so that the hook and loop can be readily brought into a position for engagement with the spring extended. Thus a quick connection is carried out and a resilient holding force is provided for maintaining these parts in firmly connected relationship.

I may also desire to form the hook portion with a secondary U section which can be employed to serve as a means for detaching the loop from the hook extremity when it is desired to remove the tire chain.

As was the case with the inside linkage attaching device, the link supporting sleeves cooperate with the hook and spring loop in maintaining the cross linkages in an extended position on the tire while this last step of connecting the ends is being carried out.

While the invention in a preferred form may include all of the parts described, it is intended that some of the components may be desired to be used independently of one another. Thus the link supporting devices may be employed in chains having other forms of attaching devices than those shown in the drawings. Similarly, I may desire to employ the novel spring lock construction with a conventional type of chain. I may also vary the shape and form of these components in various ways within the scope of the appended claims.

I claim:

1. In an automobile tire chain assembly comprising a flexible continuous inside chain, a continuous flexible outside chain, said inside and outside chains each including terminal links, a plurality of cross links arranged at equally spaced apart intervals for connecting the inner and outer chains together, respectively, to provide tread members, the end cross links connecting the terminal links of the inside and outside chains, relatively stiff tubular members enclosing the inside and outside chains between the terminal cross chains and the next adjacent cross chain for rendering those portions of said chains relatively rigid to facilitate handling, means for attaching the ends of the inside chains and the outside chains together, respectively, said means including assemblies having a length corresponding approximately to the space occurring between the several cross links connecting the side chains, the means connecting the inside chain terminal links comprising an elongated relatively rigid bridging loop secured to one terminal link of the inner chain and a hook member carried by the other terminal link of the inside chain and the connection between the terminal links of the outer chain including a hook member linked to one terminal link of the outside chain and a spring assembly, said spring assembly including a coil spring, an engaging loop for connection with said last-named hook member located through the spring and extending out one end thereof, said engaging loop including reversely folded portions extending externally of the spring for a greater portion of its length, the terminal links of the reversely folded portions projecting radially at opposite sides of the spring to provide finger gripping portions, and a second loop member attached to the other terminal link of the outer chain and having two spaced apart loop sections located within the coiled spring and secured to the end thereof.

2. The structure of claim 1 characterized in that additional relatively stiff tubular members are positioned at spaced points about the inside and outside chains to provide additional stability for the assembly.

References Cited in the file of this patent

UNITED STATES PATENTS

| | | |
|---|---|---|
| 1,340,183 | Parker | May 18, 1920 |
| 1,717,558 | Hanson | June 18, 1929 |
| 2,623,569 | Horner et al. | Dec. 30, 1952 |